United States Patent
Lah et al.

(10) Patent No.: US 8,702,911 B2
(45) Date of Patent: *Apr. 22, 2014

(54) CENTER FEED SYSTEM

(75) Inventors: Ruben F. Lah, South Jordan, UT (US); Gary Larsen, West Jordan, UT (US)

(73) Assignee: Curtiss-Wright Flow Control Corporation, Falls Church, VA (US)

(*) Notice: Subject to any disclaimer, the term of this patent is extended or adjusted under 35 U.S.C. 154(b) by 525 days.

This patent is subject to a terminal disclaimer.

(21) Appl. No.: 12/369,691

(22) Filed: Feb. 11, 2009

(65) Prior Publication Data

US 2009/0214394 A1  Aug. 27, 2009

(51) Int. Cl.
*C10G 9/18* (2006.01)

(52) U.S. Cl.
USPC ............ 196/135; 196/107; 202/239; 202/262

(58) Field of Classification Search
USPC .......... 196/135, 107, 109, 126, 127; 208/131; 202/84, 262, 252, 121
See application file for complete search history.

(56) References Cited

U.S. PATENT DOCUMENTS

| | | | |
|---|---|---|---|
| 1,656,355 A | 1/1928 | Huffmann | |
| 1,899,889 A * | 2/1933 | Bayne | ........................... 196/135 |
| 1,991,621 A | 2/1935 | Noll | |
| 2,064,567 A | 12/1936 | Riley | |
| 2,245,554 A | 6/1941 | Court | |
| 2,317,566 A | 4/1943 | Utterback | |
| 2,403,608 A | 7/1946 | Payne | |
| 2,562,285 A | 7/1951 | Timmer | |
| 2,717,865 A | 9/1955 | Kimberlin, Jr. et al. | |
| 2,734,715 A | 2/1956 | Knox | |
| 2,761,160 A | 9/1956 | Manning | |
| 2,950,897 A | 8/1960 | Bryant | |
| 3,215,399 A | 11/1965 | McInerney et al. | |
| 3,367,625 A | 2/1968 | Fortune | |
| 3,379,623 A | 4/1968 | Forsyth | |
| 3,498,323 A * | 3/1970 | Rahm | ........................... 137/592 |
| 3,617,480 A | 11/1971 | Keel | |

(Continued)

FOREIGN PATENT DOCUMENTS

RU  2043604  10/1995

OTHER PUBLICATIONS

J. J. Kelley, "Applied Artificial Intelligence for Delayed Coking", Hydrocarbon Processing, Nov. 2000, 144-A-144-J, Gulf Publishing Company, USA.

(Continued)

*Primary Examiner* — Jill Warden
*Assistant Examiner* — Joye L Woodward
(74) *Attorney, Agent, or Firm* — Kirton McConkie; Michael F. Krieger

(57) ABSTRACT

The present invention features a center feed system in combination with a coking vessel of a delayed coking system, or any other similar system. The center feed system features an inlet sleeve which slidably engages a retractable nozzle, with inlet and outlet, in fluid connection with a feed source of residual byproduct, allowing residual byproduct to flow from the feed source into the interior of the vessel, thus effectuating or inducing even thermal distribution throughout the vessel. The retractable nozzle is structured to extend through an opening in the coking vessel while introducing the residual byproduct into the coking vessel and retract out of the coking vessel and cover the opening for at least a portion of a coking cycle.

18 Claims, 5 Drawing Sheets

(56) References Cited

U.S. PATENT DOCUMENTS

| | | |
|---|---|---|
| 3,646,947 A | 3/1972 | Rochelle et al. |
| 3,716,310 A | 2/1973 | Guenther |
| 3,837,356 A | 9/1974 | Selep et al. |
| 3,852,047 A | 12/1974 | Schlinger et al. |
| 4,125,438 A | 11/1978 | Kelly et al. |
| 4,174,728 A | 11/1979 | Usnick et al. |
| 4,253,487 A | 3/1981 | Worley et al. |
| 4,275,842 A | 6/1981 | Purton et al. |
| 4,335,733 A | 6/1982 | Richards |
| 4,410,398 A | 10/1983 | Chipman et al. |
| RE31,439 E | 11/1983 | Rosensweig |
| 4,492,103 A | 1/1985 | Naumann |
| 4,531,539 A | 7/1985 | Jandrasi et al. |
| 4,611,613 A | 9/1986 | Kaplan |
| 4,626,320 A | 12/1986 | Alworth et al. |
| 4,666,585 A | 5/1987 | Figgins et al. |
| 4,726,109 A | 2/1988 | Malsbury et al. |
| 4,738,399 A | 4/1988 | Adams |
| 4,771,805 A | 9/1988 | Maa |
| 4,797,197 A | 1/1989 | Mallari |
| 4,824,016 A | 4/1989 | Cody et al. |
| 4,877,488 A | 10/1989 | Cody et al. |
| 4,923,021 A | 5/1990 | Courmier et al. |
| 4,929,339 A | 5/1990 | Elliot, Jr. et al. |
| 4,960,358 A | 10/1990 | Digiacomo et al. |
| 4,973,386 A | 11/1990 | Callegari et al. |
| 4,993,264 A | 2/1991 | Cody et al. |
| 5,004,152 A | 4/1991 | Baker et al. |
| 5,022,266 A | 6/1991 | Cody et al. |
| 5,022,268 A | 6/1991 | Wolf et al. |
| 5,024,730 A | 6/1991 | Colvert |
| 5,035,221 A | 7/1991 | Martin |
| 5,041,207 A | 8/1991 | Harrington et al. |
| 5,048,876 A | 9/1991 | Wallskog |
| 5,059,331 A | 10/1991 | Goyal |
| 5,107,873 A | 4/1992 | Clinger |
| 5,116,022 A | 5/1992 | Genreith et al. |
| 5,221,019 A | 6/1993 | Pechacek et al. |
| 5,228,525 A | 7/1993 | Denney et al. |
| 5,228,825 A | 7/1993 | Fruchtbaum et al. |
| 5,299,841 A | 4/1994 | Schaefer |
| 5,417,811 A | 5/1995 | Malsbury |
| 5,464,035 A | 11/1995 | Heinecke |
| 5,581,864 A | 12/1996 | Rabet |
| 5,633,462 A | 5/1997 | Heaslip et al. |
| 5,652,145 A | 7/1997 | Cody et al. |
| 5,785,843 A | 7/1998 | Antalffy et al. |
| 5,800,680 A | 9/1998 | Guerra |
| 5,816,505 A | 10/1998 | Tran et al. |
| 5,816,787 A | 10/1998 | Brinkerhoff |
| 5,876,568 A | 3/1999 | Kindersley |
| 5,907,491 A | 5/1999 | Canada et al. |
| 5,927,684 A | 7/1999 | Marx et al. |
| 5,947,674 A | 9/1999 | Malsbury et al. |
| 5,974,887 A | 11/1999 | Cody et al. |
| 6,007,068 A | 12/1999 | Dellacorte |
| 6,039,844 A | 3/2000 | Malik |
| 6,066,237 A | 5/2000 | Kindersley |
| 6,113,745 A | 9/2000 | Maitland et al. |
| 6,117,308 A | 9/2000 | Ganji |
| 6,223,925 B1 | 5/2001 | Malsbury et al. |
| 6,228,225 B1 | 5/2001 | Meher-Homji |
| 6,254,733 B1 | 7/2001 | Lu et al. |
| 6,264,797 B1 | 7/2001 | Schroeder et al. |
| 6,264,829 B1 | 7/2001 | Antalffy et al. |
| 6,367,843 B1 | 4/2002 | Fetzer |
| 6,539,805 B2 | 4/2003 | Heaslip et al. |
| 6,547,250 B1 | 4/2003 | Noble et al. |
| 6,565,714 B2 | 5/2003 | Lah |
| 6,644,436 B2 | 11/2003 | Hofmann et al. |
| 6,644,567 B1 | 11/2003 | Adams et al. |
| 6,660,131 B2 | 12/2003 | Lah |
| 6,738,697 B2 | 5/2004 | Breed |
| 6,751,852 B2 | 6/2004 | Malsbury et al. |
| 6,843,889 B2 | 1/2005 | Lah |
| 6,926,807 B2 | 8/2005 | Bosi et al. |
| 6,964,727 B2 | 11/2005 | Lah |
| 6,989,081 B2 | 1/2006 | Lah |
| 7,033,460 B2 | 4/2006 | Lah |
| 7,037,408 B2 | 5/2006 | Wilborn et al. |
| 7,115,190 B2 | 10/2006 | Lah |
| 7,117,959 B2 | 10/2006 | Lah |
| 7,316,762 B2 | 1/2008 | Lah |
| 7,360,508 B2 * | 4/2008 | Habib et al. ............. 122/379 |
| 7,736,470 B2 * | 6/2010 | Chen et al. ............. 201/25 |
| 2002/0134658 A1 | 9/2002 | Lah |
| 2002/0157897 A1 | 10/2002 | Hoffmann et al. |
| 2002/0166862 A1 | 11/2002 | Malsbury et al. |
| 2002/0170814 A1 | 11/2002 | Lah |
| 2003/0047153 A1 | 3/2003 | Kubel et al. |
| 2003/0089589 A1 | 5/2003 | Malsbury |
| 2003/0127314 A1 | 7/2003 | Bell et al. |
| 2003/0159737 A1 | 8/2003 | Stares |
| 2003/0185718 A1 | 10/2003 | Sellakumar |
| 2004/0118746 A1 | 6/2004 | Wilborn et al. |
| 2004/0154913 A1 | 8/2004 | Lah |

OTHER PUBLICATIONS

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

Zappe, R.W., Valve Selection Handbook, Fourth Edition, Gulf Publishing Company, Houston, Texas, (1912).

* cited by examiner

CENTER FEED SYSTEM

BACKGROUND

1. Field of the Invention

The present invention relates to a center feed system for use with a delayed coker system, which may be utilized to dispense residual by-product into a vessel, such as the several types of petroleum feed stocks into a coke drum.

2. Background of the Invention and Related Art

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

The process of delayed coking, and particularly the steps of directing a residual byproduct into an inlet from a feed source and allowing the residual byproduct to be dispensed or disposed within the vessel, comprises utilizing a dispenser that functions to dispose or direct the byproduct into the vessel. FIG. 1 illustrates one type of prior art dispenser or dispensing system common in the industry.

Specifically, FIG. 1 illustrates a cut away perspective view of a dispenser or dispensing system attached or coupled to vessel 2, shown as a coke drum commonly used in the coking industry. Vessel 2 comprises a cylindrical sidewall support body 4 and a lower flange 5. Lower flange 5 further comprises a plurality of bolt holes 7 that are used to receive high strength bolts therein to securely couple vessel 2 to another matching flanged member, such as a de-header valve or an intermediate spool assembly. Attached or coupled to or integrally formed with vessel 2 is a byproduct dispenser, shown as inlet 6, shown in the form of a cylindrical pipe having a flange segment and an opening 8 to allow inlet 6 to be in fluid connection with the interior of vessel 2. As a feed line is appropriately attached to inlet 6, the residual byproduct in the feed line is received through opening 8 in inlet 6, routed through the pipe structure of inlet 6, and dispensed or disposed within vessel 2.

The rather simple design of inlet 6 as the dispenser for the residual byproduct within vessel 2 comprises significant drawbacks. Primarily, due to the pressure within the feed, as well as the high temperature of the residual byproduct, there is significant force within the feed as it enters inlet 6. As a result of this force and the simple, linear design of inlet 6, the residual byproduct is literally shot into or essentially bursts into the interior of vessel 2, hitting the inner side of sidewall support structure 4 opposite the exit area of inlet 6. Even though vessel 2 is pre-heated to a temperature of about 450° Fahrenheit, the incoming byproduct is injected into the drum at about 900° Fahrenheit, and results is the collision of this high temperature, high velocity stream of residual byproduct with the inside surface in sidewall support body 4 that is perpendicular or substantially perpendicular to the direction of the flow of the fast moving, heated residual byproduct. Not surprisingly, this creates or causes significant problems. First, the sudden influx and contact of heated, pressurized material into a stagnant vessel causes stark heat distribution variances throughout vessel 2, namely within sidewall support body 4, and lower flange 5 and the bolts connecting the vessel to another component, such as a de-header valve, throughout the process. The heated residual byproduct is injected into vessel 2 and slams into the opposite sidewall, which instantly begins to heat the immediate and surrounding area of the sidewall. This impact point on the sidewall is the thermal center from which heat is initially distributed to the other adjacent areas of vessel 2. Once the residual byproduct enters the vessel, the opposing sidewall and the surrounding area is heated. Over time, the residual material gathers and builds up inside vessel 2 at a location opposite inlet 6. As this happens, the continuing influx of residual byproduct alternatively impacts the cooled, newly formed coke rather than the sidewall, altering the thermal center. As additional coking takes place, and as additional residual byproduct continues to be injected into vessel 2, the point of impact, and thus the thermal center, continues to move away from the opposing sidewall toward inlet 6, resulting in uneven heat distribution or thermal variance. This process is incapable of providing even heat distribution within the vessel because as each point or location increasing in distance from the thermal center will naturally be relatively cooler.

Uneven heat distribution or thermal variance existing within vessel 2 as a result of the influx of the residual byproduct in the manner described above induces uneven stress distribution within vessel 2, lower flange 5, and the corresponding flanged member coupled to vessel 2, as well as the bolts coupling the two together. As mentioned above, the delayed coking process typically comprises at least two vessels so that while one is being filled the other is being purged of the material therein and prepped to receive another batch of byproduct. Thus, during the off-cycle when a vessel is being purged of its contents it will cool and return to a state of equilibrium. It is this cyclical pattern of dispensing hot residual byproduct into vessel 2 and subsequently hydroblasting the byproduct that leads to the thermal differential and stress within vessel 2. It is this cyclical loading and unloading or stressing and unstressing of vessel 2 that is referred to as thermal cycling. Thermal cycling typically results in the weakening or fatiguing of vessel 2 and its component parts, which leads to a reduction in the useful life of vessel 2.

FIG. 2 illustrates another type of dispenser or dispensing system common in the industry. Specifically, FIG. 2 illustrates a perspective view of a dispenser or dispensing system attached or coupled to vessel 2, shown as a coke drum commonly used in the coking industry. Vessel 2 comprises a cylindrical sidewall support body 4 and a lower flange 5. Lower flange 5 further comprises a plurality of bolt holes 7 that are used to receive high strength bolts therein to securely couple vessel 2 to another matching flanged member 9, such as a de-header valve or an intermediate spool assembly. Attached or coupled to or integrally formed with vessel 2 is a first byproduct dispenser, shown as inlet feed 1, and a second byproduct dispenser, shown as inlet feed 3 positioned opposite and coaxial with one another. Each of inlet feeds 1 and 3 function to dispense byproduct into vessel 2 during a delayed coking process. Although the addition of another dispenser or inlet feed helps to alleviate some of the problems discussed above under FIG. 1, namely the lack of uniform heat distribution, the remedial effect or benefit of two opposing inlet feeds on these problems is only minimal. A significant amount of uneven heat distribution and thermal variance still exists within or throughout vessel 2 because of the inability of the inlet feeds 1 and 3 to dispense byproduct in a controlled and predictable manner. For example, byproduct from each feed inlet 1 and 3 is dispensed into the vessel. If the pressure within each inlet feed are similar, the byproduct from each feed inlet will meet somewhere in the middle and cause byproduct to be randomly displaced within vessel 2. On the other hand, in the even that a pressure differential exists between inlet feeds 1 and 3, then the byproduct will be even more randomly dispensed and the problems of thermal variance increased. Moreover, even if the pressures within each of inlet feeds 1 and 3 are uniform and the byproduct enters vessel 2 at the same or substantially the same time, the depositing and settling of the coke byproduct within vessel 2 is still unpredictable, such that build-up of coke byproduct within vessel 2 could be anywhere, including at the center, along the sidewall, somewhere in between, or any combination of these. As a result, the problems discussed above with respect to the design illustrated in FIG. 1 are equally applicable to the design shown in FIG. 2.

The general trend in the delayed coking industry is towards increased safety, durability, efficiency, and reliability. However, the prior art designs discussed above do not function to meet such goals as these designs are less than efficient and outdated. As such, there is a need to improve how the residual byproducts are injected into the large coke drums.

SUMMARY AND OBJECTS OF THE INVENTION

In accordance with the invention as embodied and broadly described herein, the present invention features a center feed injection system for use within a delayed coking system, or any other similar system. Some embodiments of the center feed injection system comprise a spool coupled to a coke drum vessel and a center feed injection system for depositing residual byproduct into the vessel through an opening in the spool, wherein the center feed system comprises a retractable injection nozzle which may be extended inwardly through an opening in one of a spool and a vessel for introducing feed stock into a coke vessel and an inlet sleeve in slidable engagement with said retractable injection nozzle, whereby the retractable nozzle may be retracted into the inlet sleeve out of one of the main body of the coking drum and the spool when not in use.

In a preferred embodiment, the center feed system further comprises a curved pipe segment removable attached to the inlet of a spool, to facilitate even dispensing or dispersion of the residual byproduct into the reservoir vessel to provide even thermal distribution throughout the reservoir vessel during a manufacturing process.

Additionally, embodiments of the present invention feature methods of dispensing residual byproduct into a reservoir vessel via one or more retractable injection nozzles.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 5, is not intended to limit the scope of the invention, as claimed, but is merely representative of the presently preferred embodiments of the invention. The presently preferred embodiments of the invention will be best understood by reference to the drawings wherein like parts are designated by like numerals throughout.

The present invention describes methods and systems for dispensing residual byproducts into a reservoir vessel, and particularly the dispensing of petroleum byproducts into a coke drum as part of a delayed coking process, thus improving the safety, reliability, economy, ease of operation and maintenance, utility, lifespan, and efficiency of the components in a delayed coking process.

Figure 3:
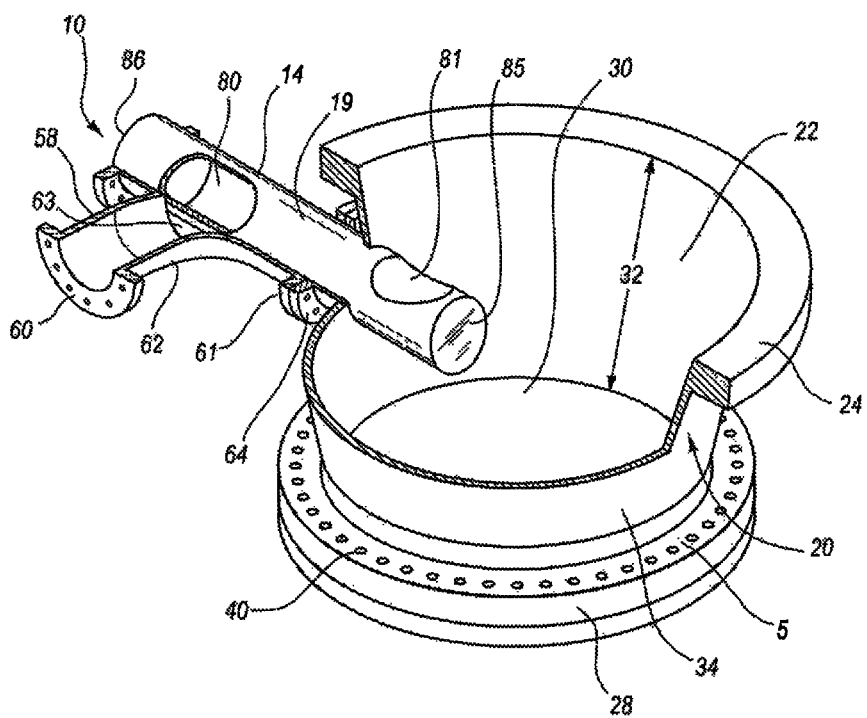
FIG. 3 illustrates a cut-away view of the center feed system in an open position, according to one exemplary embodiment of the present invention, as it is coupled to a spool that attaches between the coke drum and the de-header valve in a delayed coking system.

With reference to FIG. 3, shown is an exemplary embodiment of the present invention center feed injection system 10. This system comprises a spool 20, a retractable injection nozzle 14, and an inlet sleeve 58 designed to operate within a delayed coking system. In preferred embodiments, spool 20 comprises a cylindrical or tapered axle or support body 32 having a sidewall 34, and an upper flange 24 and lower flange 28 formed at each end of axle 32, respectively. In typical de-header operations, spool 20 is positioned intermediately between a coke drum and a de-header valve. Particularly, a coke drum (like the one shown in FIG. 1) having a matching flange section is fitted and coupled to upper flange 24 of spool 20. Likewise, a de-header valve also having a matching flange section is fitted and coupled to lower flange 28. Spool 20 further comprises an interior 30 and an interior sidewall surface 22. In some installations the coke drum maybe welded to the spool 20, or coupled to the spool 20 utilizing a plurality of bolts fitting through the plurality of bolt holes 36. Likewise the de-header valve maybe welded to the spool 20, or coupled to the spool 20 using a plurality of bolts fitting through the plurality of bolt holes 40.

Center feed system 10 comprises an inlet sleeve 58 that functions to deliver residual byproduct to a retractable injection nozzle 14. Inlet sleeve 58 comprises a flanged component 60, allowing the inlet sleeve 58 to couple to a feed line. When attached to a feed line, a residual byproduct, such as petroleum byproducts used in the manufacture of coke, may enter the center feed system 10.

In preferred embodiments, the retractable injection nozzle 14, when in an open position, as shown in FIG. 3, is in fluid communication with the inlet sleeve 58, allowing residual petroleum byproduct to flow through the inlet sleeve 58 and into the retractable injection nozzle 14. When the retractable injection nozzle 14 is in the open position, petroleum byproduct may be allowed to flow through the retractable injection nozzle 14 out an outlet 81 into the interior of the spool 30 or the interior of a vessel.

In preferred embodiments, the retractable injection nozzle 14 may be modified to adjust flow characteristics. In preferred embodiments, the straight portion 19 of the retractable injection nozzle 14 may be manufactured with pipe that has the same inside diameter as the curved pipe segment 62 of the inlet sleeve 58. Alternatively, the straight portion 19 of the retractable injection nozzle 14 may be manufactured with pipe that has a larger or smaller inside diameter as the curved pipe segment 62 of the inlet sleeve 58. In preferred embodiments, the straight portion 19 of the retractable injection nozzle 14 is coped precisely to fit the ellipse of the curved pipe segment 62. The shape of the injection nozzle 14 may also be shaped to be a seamless continuation of the contour of the curved pipe segment 62 when it is aligned in an open position to allow residual byproducts to flow into the vessel. In some embodiments, the outlet 81 of the retractable injection nozzle 14 may be constructed in various shapes and sizes. In preferred embodiments of the present invention, the outlet 81 comprises an elliptical shape and has a diameter at least as large as the cross sectional diameter of the interior cavity 88 of the retractable injection nozzle 14, such that the outlet 81 allows for an even flow of residual byproduct into the spool 20 and vessel without increasing resistance to the flow of byproduct through the center feed system 10.

Figure 4:
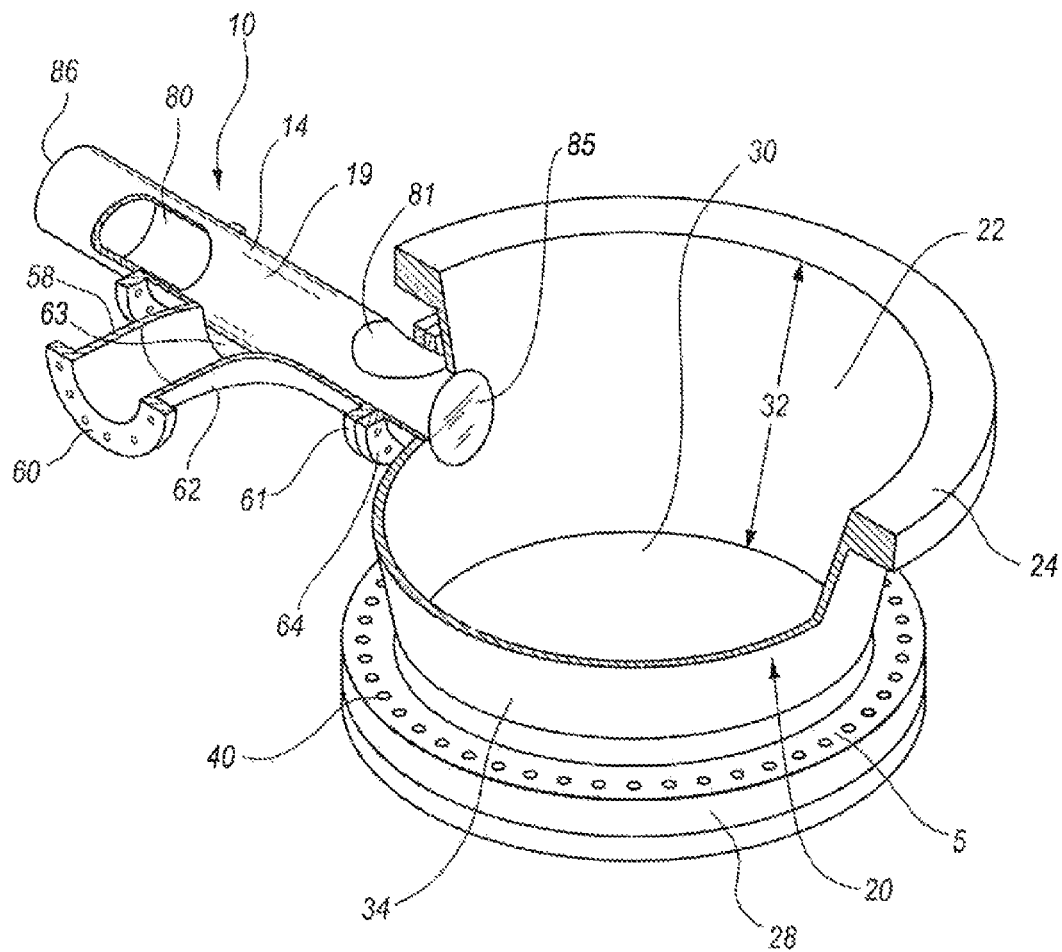
FIG. 4 illustrates a cut-away view of the center feed system in a retracted position.

The inlet sleeve 58 preferably comprises a flanged surface 60 proximate to, and being utilized to connect the inlet sleeve 58 to, a delivery main and a second flanged surface 61 for connecting the inlet sleeve 58 to the flanged inlet 6 of a spool 20. In preferred embodiments, the inlet sleeve 58 is designed to hold and be slidably connected to a retractable injection nozzle 14 allowing the injection nozzle 14 to move from an open position, as illustrated in FIG. 3, to a retracted position, as illustrated in FIG. 4.

Inlet sleeve 58 functions to receive the residual byproduct from the feed and extends from flange 60 as shown. Inlet sleeve 58 integrally forms with curved pipe segment 62 that is shown in FIGS. 3 and 4 to bend approximately 90°. Of course, curved pipe segment 62 may also be designed to bend a significant amount less, or more, than is illustrated in FIG. 3 or 4, to accommodate installation of center feed system 10 into preexisting coker operations. For example, should a feed line in a particular coke operation require a more obtuse or acute angle, curved pipe segment 62 may be designed accordingly. Further, in other embodiments, curved pipe segment 62 may also accommodate redirection of petroleum byproducts in a vertical axis, as well as the horizontal bend illustrated in FIGS. 3 and 4. In other embodiments, curved pipe segment 62 may be manufactured to consist of more than on bend, allowing the inlet sleeve 58 to track a curvilinear path required for installation of the center feed system 10. Accordingly, the curved pipe segment 62 allows the center feed system 10 to be manufactured to retrofit any existing decoking operation, flexibly allowing implementation of a center feed injection system 10 according to preferred embodiments of the present invention to be implemented efficiently, and with minimal costs for installation.

In preferred embodiment, each of the feed line, inlet 58, curved pipe segment 62 and retractable injection nozzle 14 are in fluid connection with one another when the retractable injection nozzle 14 is in an open position. When in an open position, a residual byproduct may be allowed to travel therethrough and ultimately be deposited within spool 20 and an attached coke drum. Steam, water or other fluids may also be allowed to travel through the center feed injections during various phases of the delayed cooking process. However, when the retractable injection nozzle 14 is in a retracted position as illustrated in FIG. 4, the feed line inlet 58 and curved pipe segment 62 may remain in fluid connection with the feed line but flow of residual byproduct through the center feed system into the coke drum is prevented. When retracted, the system 10 may additionally block the movement of particulate matter (e.g., coke fines) from entering the system 10 from the vessel as coke is cut away from the interior of the vessel.

Center feed system 10 may comprise of scheduled pipe or cast material to withstand and deliver the high temperature, high pressure residual byproduct as intended. Of course, one of ordinary skill in the art will recognize that other sizes and materials may be used depending upon the particular end use, and as system requirements dictate. Indeed, although particularly suited to be used within a delayed coking process, the present invention may be applicable in other areas of manufacture, each requiring different engineered designs.

With reference to FIG. 3, as residual byproduct enter inlet sleeve 58 of center feed system 10 from the feed, it does so at a high temperature and velocity. Subsequently, the residual byproduct is routed through curved pipe segment 62. The residual byproduct enters curved pipe section 62 and encounters inlet 80 of retractable injection nozzle 14. Residual byproduct travels from inlet 80 through the retractable injection nozzle 14, and exits outlet 81. In preferred embodiments, as residual byproduct enters the interior 30 of the spool 20 and/or vessel, it does so near the center of the spool 20 in a direction comprising a vertical component. The feed into the center of the interior 30 of the spool 20 ensures that the spool and the sidewalls of a coking vessel are exposed to a consistent flow of byproduct. Further, the controlled flow of molten residual byproduct from the injection nozzle 14 ensures that the exposure to molten residual byproduct is consistent across the entire surface area of the interior of the spool 20 and vessel, reducing the potential detrimental effects associated with repetitive thermal cycling.

As previously noted above, and illustrated in FIG. 1, injection of residual byproduct into a coking vessel through an opening in the spool has typically been performed in a way that disproportionally heats the side of the vessel opposite the inlet. This disproportionate heating of one side wall causes the side wall to expand as additional byproduct is injected into the vessel. In these simple devices, the residual byproduct itself begins to insulate the vessel, allowing the exterior opposite the inlet feed line to cool slightly, contracting the metal. This disproportionate heating and cooling cycle places stress on the structural elements of the decoking operation, for example the drum, spool, valves and connections between each of these mechanical systems. Repetitious thermal cycling decreases the longevity of vessel and spool functioning, resulting in the need to perform expensive replacement and or repairs of the coking vessel and spool. Ejecting residual byproduct in a nearly vertical direction into the center of the spool ensures a more uniform heating cycle, which decreases detrimental stress placed on the system during thermal cycling and the co-commitant need to repair or replace a coke drum.

In preferred embodiments, the residual byproduct is dispensed in a nearly vertical direction into spool 20 effectively spraying molten resid in a consistent pattern across the inner surface of the spool 20 and/or vessel. Rather than impacting only the interior sidewall surface 22 at a perpendicular or substantially perpendicular manner as found in other designs. This vertical, or nearly vertical, dispensing is a direct result of the positioning of center feed system 10 and the angle of the curved segment of the interior cavity 82 of the retractable injection nozzle 14. Accordingly, as the residual byproduct passes into the retractable injection nozzle 14, through inlet 80 and exits outlet 81, the angle of injection of residual byproduct into the spool 20 can be controlled by utilizing different lengths of a retractable injection nozzle 14 or by dictating the angle of curve of the curved segment of the interior cavity 82.

Additionally, the outlet 81 or retractable injection nozzle 14 may be fitted with a flow control device. In some embodiment, a flow control device comprising a series of holes or perforations at the outlet 81 may be utilized to alter the flow of molten resid from the outlet. For example, a flow control device could be utilized to modify the laminar nature of the flow of the molten resid from the outlet. Similarly, flow control devices may be used at various points in the center feed system 10 to alter the flow of molten resid through the center feed system 10. For example, one or more flow control device(s) may be utilized to modify the laminar nature of the flow of resid through the system, or to alter the nature of flow through the center feed system 10 in a desirable fashion.

In preferred embodiments of the present invention, residual byproduct exits the outlet 81 at roughly a 90° angle relative to the entrance point on a side wall 22. As such the residual byproduct is not directed towards the opposite side of the vessel or spool 20 but instead is cause to contact the entire interior surface of the spool and vessel in a uniform fashion producing a more uniform heating cycle. Alternatively, injection system 10 may be designed to introduce molten resid into the vessel at about a 85°, 80°, 75°, 70°, 65°, 60°, 55°, 50°, 45°, 40°, or 35° angle relative to the entrance point on a side wall 22. Alternatively, injection system 10 may be designed to introduce molten resid into the vessel at about a 95°, 100°, 105°, 110°, 115°, 120°, 125°, 130°, 135°, 140° or 145° angle relative to the entrance point on a side wall 22.

In some embodiments, the particular angle of curved segment of interior cavity 82 and length of retractable injection nozzle 14 may vary depending upon system requirements and the size and dimensions of the vessels in which the material is being deposited. In a preferred embodiment, curved segment of interior cavity 82 comprises an angle between 0 and 90° to correspond to the range of angle desired within a particular decoking vessel. In preferred embodiments, the curved segment of interior cavity 82 lies between 60 and 90°, effectively producing a vertical or nearly vertical spray of residual byproduct exiting outlet 81, filling spool 20 and vessel in a uniform fashion. Alternatively, embodiments may utilize a curved segment of the interior cavity 82 with between 30 and 60° angle relative to the point of entry inside the spool 20 producing a substantially vertical spray of residual byproduct into the spool 20 and coking vessel.

In some embodiments, a shorter retractable injection nozzle 14 may be used in conjunction with a curved segment of an interior cavity 82, such that the shortened length of the retractable injection nozzle is coupled with a curved segment of the interior cavity 82 with an angle designed to spray residual byproduct into the desired point in the interior of the coke drum. Alternatively, some embodiments utilize a longer retractable injection nozzle 14 placing the outlet 81 of the retractable injection nozzle 14 directly in the center of the spool 20 or even extending beyond the center of the spool 20. The longer retractable injection nozzle may be utilized in coordination with a more vertical curve in the curved segment of the interior cavity 82, such that the residual byproduct would be delivered directly at or near the center of the vessel and spool 20, or to the desired spot within the interior of the spool 20 to produce uniform filling of the spool 20 and vessel.

FIGS. 3 and 4, for example, depict preferred embodiments of the present invention in which a segment of retractable nozzle 14 is utilized that has insufficient length to extend the outlet 81 of the retractable injection nozzle 14 to the center of the spool 20. In accord with the desire to uniformly fill the spool and vessel from the center resulting in a more uniform heating cycle, the angle of the curved segment of the interior cavity 82 is adjusted appropriately to result in a spray of residual byproduct being propelled into the center of the vessel. As such, the various embodiments of the present invention use different angles for the curved segment of the interior cavity 82 of the retractable injection nozzle 14 and also use of various lengths of the straight section 19 of the retractable injection nozzle 14 to ensure uniform heating cycle.

Further, some embodiments alter both the angle of the curved segment of the interior cavity 82 as well as the length of the straight section 19 of the retractable injection nozzle 14 to accommodate viscosity, velocities and temperature gradients of residual byproduct being pumped to the retractable injection nozzle 14.

Insert sleeve 58 and retractable injection nozzle 14 may comprises a uniform cross sectional area and/or interior diameter, or may comprise varying cross sectional areas or diameters. Designing the center feed system 10 to comprise varying cross sectional areas or diameters allows the center feed system 10 to provide for, and accommodate, varying volumes and velocities of residual byproducts to be transported through the system, as well as to help equalize the flows of residual byproducts for delivery within the spool 20.

The outlet 81 of the retractable injection nozzle 14 may also be constructed to be elliptical in design so as to accommodate residual bypass material as it passes from the outlet 81 into the spool 20 and vessel. In various embodiments, the shape of the outlet 81 may be modified to accommodate various velocities and viscosities and material types being passed through the retractable injection nozzle 14. Additionally, the shape and size of the opening may be modified to alter the spray pattern and characteristics ejecting from the outlet 81 of the retractable injection nozzle 14 to alter and control the spray of residual byproduct from the retractable injection nozzle 14, increasing the capacity of the retractable injection nozzle 14 to produce a more uniform heating cycle or to alter the characteristics of the heating cycle in a desirable fashion. For example, a larger outlet 81 may be used to reduce the velocity of residual byproduct material exiting the retractable injection nozzle 14, effectively reducing the surface area and height within the vessel to which the molten residual byproduct being ejected from the outlet 81, would reach. In other embodiments, a smaller outlet 81 would produce a stream of higher velocity residual byproduct entering the spool 20 and vessel effectively increasing the surface area and height to which the spray would reach inside a vessel. In this fashion, the pattern of molten residual byproduct being ejected from the retractable injection nozzle 14 may be controlled to produce a more uniform heating cycle, or to alternatively impact the vessel in a fashion, which increases longevity of vessels and spools, effectively reducing the amount of downtime necessary for maintenance and repair.

Some embodiment of the present center feed system 10 provide advantages over other inlet feed systems. Indeed, many of the deficiencies in the prior art designs are resolved by the present invention. For example, the center feed system 10 produces a less volatile and violent spray of residual byproduct into the spool 20 and vessel decreasing thermal variants and detrimental effects associated with thermal cycling within the delayed coking operation. Some embodiment of the center feed system 10 reduce the stresses placed on the vessel, spool, valve and the connections between these mechanical systems.

Moreover, use of preferred embodiments of the center feed system 10 produces a more even distribution of material, leading to a more even thermal distribution throughout the vessel and the delayed coking system. This is advantageous for several reasons. For example, thermal differentials may be decreased because the entire vessel or spool (and connection means) maintains even heat distributions with little or no thermal variance because product is introduced into different or various parts of the vessel at substantially the same time. Thus, one side of the vessel is not caused to receive byproduct first, while the other parts of the vessel remain free of byproduct until later in the process. As another example, much of the stress to the vessel, spool, deheader valve and their connections produced by the use of other inlet systems is eliminated. Uneven heat distribution induces uneven pressure points between the components of a delayed coking system, namely, the vessel and the de-heading valve, and a spool, if used. Uneven thermal distribution puts undue stress on the bolts and flange connections between the components, possibly causing them to fail sooner than necessary. By providing tangential dispensing, thermal heat distribution is more even, thus also evening out the stresses experienced within each component and the overall system. As a further example, detrimental effects associated with thermal cycling within the vessel and other components of the system is significantly reduced, thus increasing the lifespan of each of these components. The detrimental effects associated with thermal cycling is reduced because the cyclical stressing, and fatiguing of each vessel is reduced during the coking cycle due to the more even distribution of heat that results from the center feed system.

Other advantages to the present invention tangential injection system, that are not specifically recited herein, may be apparent to one ordinarily skilled in the art and are intended to come within the scope of the disclosure as taught and suggested, as well as within the appended claims. As such, those advantages that have been set forth and specifically recited are not meant to be limiting in anyway.

FIG. 4 illustrates a cut away view of a spool 20, and center feed system 10 in a retracted position. During the process of delayed coking, residual byproduct is fed into the spool 20 and vessel until the vessel is completely or nearly filled. Once the desired level of residual material has been fed into the vessel, the flow of residual byproduct is stopped. In typical prior art decoking processes, the vessel is then quenched with water effectively cooling and hardening the residual byproduct. According to some embodiments of the present invention, the inlet sleeve 58 and retractable injection nozzle 14 may be utilized to pump steam and/or water into the spool 20 and vessel, effectively purging the inlet sleeve 58 and retractable injection nozzle 14 of any remaining residual byproduct and/or to allow for quenching of the vessel and its contents. This effectively clears the inlet sleeve 58 and retractable injection nozzle 14, and simultaneously quenches the vessel, reducing the amount of time and water utilized to quench the vessel. In preferred embodiments, once the inlet sleeve and retractable injection nozzle 14 have been purged with steam and/or water, the retractable injection nozzle 14 may be retracted as shown in FIG. 4.

Various methods for retracting the retractable injection nozzle 14 may be utilized according to embodiments of the present invention. In preferred embodiments, an actuator may be attached to the first end of the retractable injection nozzle 86. The actuator may be used to apply force to the retractable injection nozzle 14, effectively retracting the retractable injection nozzle 14 from the interior of the spool 30. As depicted in FIG. 4, the second end 85 of the retractable injection nozzle 14 then effectively forms a portion of the interior surface wall 22 of the spool 20. Retracting the injection nozzle 14 after a vessel has been filled, quenched and the inlet sleeve and retractable injection nozzle 14 have been purged, allows for subsequent removal of the hardened carbonaceous matter from a coking vessel, utilizing one of various techniques known in the art, without the risk of clogging the center feed system with coke fines or other particulate matter.

Figure 1:
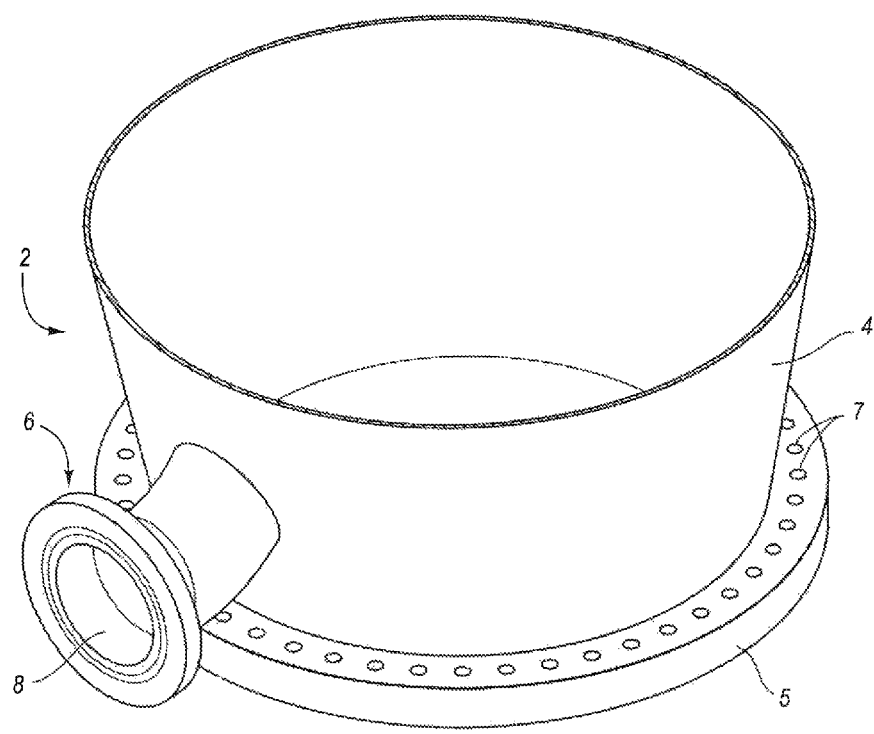
FIG. 1 illustrates a cut away perspective view of one prior art dispenser or dispensing system as coupled to a vessel in the form of a coke drum.
Figure 2:
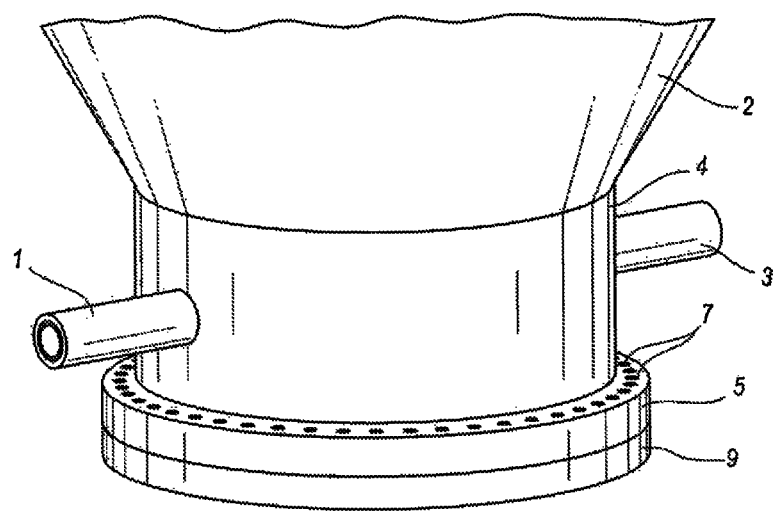
FIG. 2 illustrates a perspective view of another prior art dispenser of dispensing system, namely a system comprising two opposing, co-axial inlet feeds coupled to a vessel in the form of a coke drum.

Typically, the hardened carbonaceous material is cut away from the interior of a vessel utilizing a high pressure water drill. As the solid carbonaceous material is cut away from the interior of the vessel, it falls though a port in the bottom of the vessel through the interior 30 of the spool 20 to an area below the vessel commonly referred to as the chute, where it is collected and discarded or utilized for subsequent purposes. The process of delayed coking, and particularly the steps of directing a residual byproduct into an inlet from a feed source and allowing the residual byproduct to be dispensed or disposed within the vessel, comprises utilizing a dispenser that functions to dispose or direct the byproduct into the vessel. FIG. 1 illustrates one type of dispenser or dispensing system common in the industry.

As noted above, FIG. 1 illustrates a cut away perspective view of a dispenser or dispensing system attached or coupled to vessel 2, shown as a coke drum, commonly used in the coking industry. As a feed line is attached to inlet 6, the residual byproduct in the feed line is received through opening 8 in inlet 6, routed through the pipe structure of inlet 6, and dispensed or disposed within vessel 2. Once the vessel is full steam is piped through the inlet system into the vessel. Steam clears the inlet system and strips the coke of valuable hydrocarbon by products, which are allowed to escape through the overhead feed line where they are typically routed to fractionators. Once all of the valuable hydrocarbon by products have been stripped from the coke resident in the vessel, steam is pumped into the vessel and released through an outlet to the blow down recovery area until the drum temperature of the vessel and its contents reaches approximately 500° F. Typically thereafter, water is pumped into the vessel through the inlet system and released into the blowdown area until the contents of the vessel reach approximately 200° F. Once quenched the deheader valves are opened, and the process of cutting coke from the interior of the vessel begins.

The simple design depicted in FIG. 1 creates problems as coke is cut away form the interior of the vessel. Because the inlet 6 remains open in the simple system, coke fines and particulate matter would be allowed to accumulate in the inlet system, effectively clogging the inlet system. To ameliorate the clogging issue, some operations allow water to flow through the inlet system during the entire cutting process to ensure that the inlet system remains unclogged. In some operations 400-1000 gallons of water per hour are pumped through the inlet system during the cutting process to ensure that the inlet system remain unclogged.

Because preferred embodiments of the center feed system utilize a retractable injection nozzle as depicted in FIGS. 3 and 4, the retractable injection nozzle is not exposed to solid carbonaceous particles as they fall from the vessel to the chute below, effectively reducing clogging and/or damage that could be caused to the injection nozzle if allowed to remain exposed to the falling solid carbonaceous matter. Alternatively, the present invention contemplates utilizing a fixed injection nozzle with a slidable closure, which could be utilized to cover the outlet 81 of the fixed injection nozzle after a heating cycle but before the vessel is decoked. Alternatively, the invention contemplates utilizing a injection nozzle, which is connected to an actuator that would apply a tortional force to the injection nozzle once the vessel has been filled to a desired level with residual byproduct, such that the outlet 81 of the injection nozzle would point down, reducing the opportunity for solid carbonaceous material to pack into and clog the injection nozzle without effectively having to retract the nozzle itself from the interior 30 of a spool 20. However, in preferred embodiments, and as illustrated in FIGS. 3 and 4, a retractable injection nozzle 14 is utilized.

In addition to effectively sealing inlet 6 of the spool 20, the retractable injection nozzle 14 seals the opening in the curved pipe segment 63 blocking the flow of matter and/or fluid from inlet feeds 3. Once the solid carbonaceous material has been removed from the interior of the vessel by means utilized in the art, the vessel is clear and ready to be filled with additional residual byproduct. At a desired time, the retractable injection nozzle could then be moved to an open position as illustrated in FIG. 3, reopening the passageway from the inlet sleeve 58, through the inlet 80, through the retractable injection nozzle 14 and to the outlet 81, allowing a subsequent cycle of residual byproduct to be pumped into the vessel. In this fashion, the process of filling, quenching and removing solid carbonaceous material from a coker vessel may be accomplished repetitively, with minimal damage to the coker vessel and spool of a delayed coker unit system.

Figure 5:
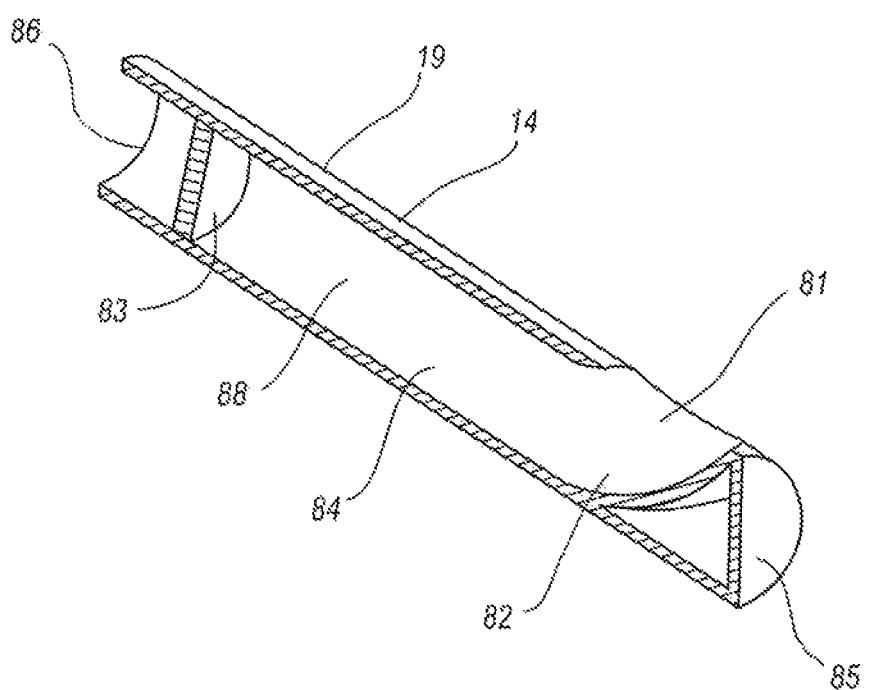
FIG. 5 illustrates a perspective view of a retractable injection nozzle according to one exemplary embodiment of the present invention.

FIG. 5 illustrates a cut away view of a injection nozzle, which may be a retractable injection nozzle 14. The depicted retracted injection nozzle, as utilized according to exemplary embodiments of the present invention, comprises a first end of the retractable injection nozzle 86, an interior cap 83, an interior cavity 88, a straight segment of the interior cavity 84, a curved segment of the interior cavity 82, a second end of the retractable injection nozzle 85, and a straight section of the retractable injection nozzle 19. In preferred embodiments, the retractable injection nozzle 14 is structured as shown to allow the entire retractable injection nozzle 14 to, slidably engaging the straight portion of an inlet sleeve 58, aligning a inlet 80 with the inlet sleeve 58 and exposing the outlet 81 of the retractable injection nozzle 14 to the interior of a vessel, effectively allowing residual byproduct to flow through the inlet sleeve 58 and retractable injection nozzle 14 from the outlet 81 into a vessel. As noted previously, the angle of the curved segment of the interior cavity 82 may be modified to adjust the flow characteristics of the residual byproduct into the vessel as desired. Additionally, the shape and size of the outlet 81 may be modified as desired to produce desirable flow patterns of residual byproduct into a vessel. Additionally, the length and diameter of the straight section 19 of the retractable injection nozzle 14 may be modified as desired to produce the desired flow of residual byproduct through the injection nozzle 14 itself and into the interior of a spool 30 and vessel.

The first end of the retractable injection nozzle 86 is structured, in preferred embodiments, to provide attachment to an actuating means, allowing the retractable injection nozzle 14 to interchangeably be moved to an open or retracted position to allow for subsequent cycles of coking and decoking of a vessel. Various actuator means are contemplated by the present invention. For example, electric actuating means, hydraulic actuating means, pneumatic actuating means and manual actuating means may all be utilized in accord with various embodiments of the present invention. One skilled in the art would appreciate that other actuating means are available and may be utilized in conjunction with the present invention to effect the desirable control over the opening and retracting of the injection nozzle 14 itself.

The present invention contemplates that the shape of the retractable injection nozzle 14 will conform to the interior cavity of the inlet sleeve. While depicted with a circular cross section in FIGS. 3, 4 and 5, it is contemplated that the cross sectional shape of the interior of the inlet sleeve 58 and co-commitant shape of the retractable injection nozzle 14 itself may vary from circular. For example, the retractable injection nozzle may be structured to have an elliptical cross section. Altering the shape of the cross section of the retractable injection nozzle 14 may be desirable to alter flow characteristics and ejection pattern of residual byproduct. Different flow consistencies and velocities may dictate further that the interior cavity 88 of the retractable nozzle 14 as well as the interior cavity 88 of the inlet sleeve 58 structured to have disparate cross sections throughout the length of the straight section 19 of the retractable injection nozzle 14. For example, in some embodiments it is desirable to use, as shown a roughly cylindrical and straight interior cavity 88, while in other embodiments it is desirable that the interior diameter of the interior cavity 88 progressively increase or decrease along the length of the straight section 19 of the retractable injection nozzle 14 from the first end 85 of the retractable injection nozzle 14 to the second end 86 of the retractable injection nozzle 14, effectively decreasing or increasing resistance applied to the residual byproduct as it flows through the retractable injection nozzle 14.

As noted previously, the size and shape of the inlet 80 and outlet 81 may be altered to conform, as is the case, with inlet 80 with the shape of the interior of the inlet sleeve 58 at the curved pipe segment 63, allowing for fluid passage of residual byproduct through the inlet sleeve 58 and injection nozzle 14 without encountering resistance of obtrusive structural elements.

It should be noted that the present invention center feed system and dispenser system can be used with or coupled directly to a coke drum, eliminating the use of a spool section. In this embodiment, the center feed system and system would function as described above, only the residual byproduct would be dispensed directly into the coke drum.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes that come within the meaning and range of equivalency of the claims are to be embraced within their scope.

What is claimed and desired to be secured by Letters Patent is:

1. A center feed system comprising:
   a coking reservoir vessel having an opening; and
   a retractable injection nozzle comprising an inlet and outlet wherein the retractable injection nozzle is structured to extend through the opening into said coking reservoir vessel while introducing residual byproduct into said reservoir vessel during a coking cycle, and structured to retract out of the reservoir vessel and cover the opening for at least a portion of each coking cycle.

2. The center feed system of claim 1, further comprising:
   an inlet sleeve attached to the reservoir vessel in slidable engagement with said retractable injection nozzle whereby the retractable injection nozzle may be retracted into the inlet sleeve.

3. The center feed system of claim 2, wherein the inlet sleeve comprises a first flanged surface for attachment to an inlet feed line and a second flanged surface for connection to the reservoir vessel.

4. The center feed system of claim 2, wherein the inlet sleeve comprises a curved pipe segment.

5. The center feed system of claim 2, wherein the inlet is an elliptical shaped opening structured to match the shape of an ellipse formed in a curved pipe segment of the inlet sleeve.

6. The center feed system of claim 2, wherein one of said inlet sleeve and said retractable injection nozzle comprises varying cross-sectional areas along its span to provide for and accommodate varying volumes of said residual byproduct.

7. The center feed system of claim 1, wherein the retractable injection nozzle is roughly cylindrical in shape.

8. The center feed system of claim 1, where-in the retractable injection nozzle completely retracts from the interior of the reservoir vessel for at least a portion of each coking cycle.

9. The center feed system of claim 1, wherein the outlet is an elliptical shaped opening.

10. The center feed system of claim 1, wherein the retractable injection nozzle comprises an end structured to form a portion of an interior wall surface of the reservoir vessel when retracted.

11. The center feed system of claim 1, wherein said coking reservoir vessel comprises a spool attached to a drum, the opening being formed in the spool.

12. The center feed system of claim 1, wherein said coking reservoir vessel comprises a spool attaching at least two flanged components together.

13. The center feed system of claim 1, wherein the outlet is structured to dispense said residual byproduct within said reservoir vessel at an angle between 0 and 90 degrees.

14. The center feed system of claim 1, wherein the outlet is structured to dispense a majority of said residual byproduct within said reservoir vessel at an angle between about 20 and 30 degrees.

15. The center feed system of claim 1, wherein the outlet is structured to dispense a majority of said residual byproduct within said reservoir vessel at an angle between about 30 and 60 degrees.

16. The center feed system of claim 1, wherein the outlet is structured to dispense a majority of said residual byproduct within said reservoir vessel at an angle between about 60 and 90 degrees.

17. A center feed injection system for use within a delayed coking system, said center feed injection system comprising:
  a spool fittable to a coke drum and a de-header valve such that the spool and the coke drum comprise a reservoir vessel, the spool having an opening; and
  a center feed system coupled to said spool, said center feed system comprising:
    a retractable injection nozzle configured to extend through the opening into the reservoir vessel to inject residual byproduct into the reservoir vessel and to retract from the reservoir vessel to seal the opening while the residual byproduct is processed to form coke;
    an inlet sleeve attached to the spool in slidable engagement with said retractable injection nozzle.

18. A delayed coking system comprising:
  a feed source capable of delivering a petroleum byproduct to a reservoir vessel;
  the reservoir vessel;
  a de-header valve attached to the reservoir vessel;
  a center feed injection system in operation with said reservoir vessel, said center feed injection system comprising:
    a retractable injection nozzle comprising an inlet and outlet wherein the retractable injection nozzle is structured to extend through an opening in a sidewall of the reservoir vessel and into the reservoir vessel to inject residual byproduct into the reservoir vessel during a coking cycle, and structured to retract out of the reservoir vessel and cover the opening for at least a portion of a delayed coking cycle.

\* \* \* \* \*